United States Patent Office 2,999,825
Patented Sept. 12, 1961

2,999,825
EPOXY-POLYAMIDE-ESTER RESIN REACTION PRODUCT
Don E. Floyd, Robbinsdale, and Dwight E. Peerman, Minneapolis, Minn., assignors to General Mills, Inc., a corporation of Delaware
No Drawing. Filed Dec. 12, 1958, Ser. No. 779,859
7 Claims. (Cl. 260—18)

This invention relates to reaction products of certain amino polyamide-ester blends with epoxy resins.

In many applications of amino polyamide-epoxy products a low viscosity is needed while the desirable physical properties of the final product must be retained. The addition of diluents to the reactants will decrease the viscosity but in general such diluents will degrade the physical properties of the final product causing a decrease in heat distortion temperature and hardness.

In the past, viscosity reduction in a system comprising amino polyamides and epoxy resins, has been achieved by adding viscosity reducers to the epoxy resins. Such viscosity reducers are mono epoxy compounds which react with amine and carboxyl groups but do not promote crosslinking in the system. Illustrative examples of such viscosity reducing compounds are styrene oxide, butyl glycidyl ether and phenyl glycidyl ether which are generally added to the epoxy resins in amounts varying from 5 to 20 percent. However, since epoxy resins are generally already less viscous than the amino polyamides in the system the requirement of low viscosity in certain applications has not been achieved to the fullest extent in this manner. The usual diluents for epoxies can not be added to the amino polyamides since a reaction occurs forming an even more viscous product.

It has now been found that esters of alpha-beta unsaturated acids act as a reactive diluent resulting in a polyamide of reduced viscosity. When reacted with epoxy resins, this polyamide ester blend does not materially affect the physical properties of a final reaction product and in fact provides for increased pot life and reduced temperature of exotherm.

It is, therefore, an object of this invention to provide a novel epoxy amino polyamide-ester reaction product.

The epoxy resins employed as co-reactants are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee Patents 2,585,115 and 2,589,245. Several of these resins are readily available commercial products.

Typical polyhydric phenols useful in the preparation of epoxy resins include resorcinol and various bisphenols resulting from the condensation of phenol with aldehydes and ketones such as formaldehyde, acetaldehyde, acetone, methyl ethyl ketone, and the like. A typical epoxy resin is the reaction product of epichlorohydrin and 2,2-bis (p-hydroxy phenyl) propane (Bisphenol A), the resin having the following theoretical structural formula

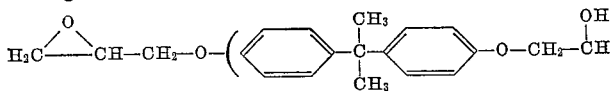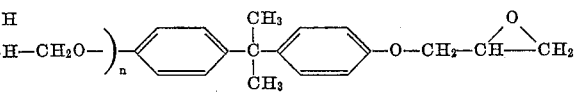

where $n$ is 0 or an integer up to 10. Generally speaking, $n$ will be no greater than 2 or 3 and is preferably 1 or less.

Epoxy resins may be characterized further by reference to their epoxy equivalent weight, the epoxy equivalent weight of pure epoxy resins being the mean molecular weight of the resin divided by the mean number of epoxy radicals per molecule, or in any case the number of grams of one gram-equivalent of epoxide. Epoxy resinous compositions encompassed by this invention are those having an epoxy equivalent weight of 140 to 300, the preferred epoxy equivalent weight being 185 to 220, expressed in terms of grams of compound per epoxy group.

The amino polyamides which may be employed are certain basic polyamides having relatively high amine numbers. These basic polyamides are derived by the reaction of polymeric fat acids with an excess of a polyalkylene polyamine which results in a polyamide having unreacted amino groups. These polyamides contain two primary amine groups and one or more secondary amine groups. In the amidification reaction the primary amine groups are principally involved, the high amine number being due to the presence of the secondary amine groups.

The amidification reaction may be carried out under the usual conditions employed for this purpose. Generally this involves reaction of about 200° C. for approximately 3 hours. The amine number referred to herein is the number of milligrams of potassium hydroxide equivalent to the amine groups in one gram of product. The polyamides derived from diethylene triamine generally have a lower amine number in the range of 50–200. If the longer chain polyamines are employed, the amine number will be correspondingly higher.

The polymeric fat acids employed in preparing the polyamide resins are those resulting from the polymerization of drying or semi-drying oils or the free acids or the simple aliphatic alcohol esters of these acids, for example sources rich in linoleic acid. Suitable drying or semi-drying oils include soybean, linseed, tung, perilla, cottonseed, corn, sunflower, safflower, and dehydrated castor oil. Suitable fatty acids may also be obtained from tall oil, soap stock, and other similar materials. In the polymerization process for the preparation of a polymeric fat acid the fatty acids with sufficient double bond functionality combine for the most part, probably by a Diels-Alder mechanism, to provide a mixture of dibasic and higher polymeric fat acids. These acids are often referred to as dimers, trimers, and so forth. In place of this method of polymerization any other method of polymerization may be employed whether the resultant polymer possesses residual unsaturation or not. Illustrative of a method of polymerization which may be employed are found in U.S. Patents 2,793,219 and 2,793,220. The term "polymeric fat acid" as used herein is intended to include the polymerized mixture of acids which usually contain a predominant proportion of dimer acids, a small quantity of trimer and higher polymeric fat acids and some residual monomer.

It should be appreciated that the polymeric fat acids will as a practical matter result from fatty acid mixtures that contain a preponderance of linoleic acid since the only naturally occurring polyunsaturated acids available in large quantities is linoleic acid. It should also be appreciated that since linoleic acid occurs in nature as a complex mixture in every instance it is available in various degrees of purity ranging from relatively expensive pure linoleic acid that has been laboriously purified to crude sources such as tall oil and soap stock which contain substances other than fatty acids. One method of obtaining the linoleic rich fatty acids is by separating a major portion of the oleic and saturated fatty acids from any convenient and economical source of fatty acids having a high iodine value. In addition polymeric fat acids are readily available commercial products. One such product is "Empol 1022" sold by Emery Industries, Inc.

The polyamines employed to react with the above described polymeric fat acids in the preparation of the amino polyamide have the general formula $$H_2NR(NHR)_nNH_2$$

where R is an alkylene radical and $n$ is an integer of from 1 to 6. Illustrative of polybasic amines are diethylene triamine, triethylenetetramine, tetraethylene pentamine, di-1,3-propanetriamine, tri-1,3-propanetetramine, di-1,2-propanetriamine and the like. Thus, the alkylene radical in the above formula is generally ethylene but should not be limited thereto.

The esters employed in this invention as reactive diluents are the alkyl esters of alpha-beta unsaturated acids such as maleic acid, fumaric acid, acrylic acid and methacrylic acid. Illustrative of such esters which may be employed are dioctyl maleate or fumarate, dibutyl maleate or fumarate, 2-ethyl hexyl acrylate and hexyl methacrylate. These esters are prepared in a manner well known to those skilled in the art and no purpose would be served by a detailed repetition of such method.

In general the alpha-beta unsaturated esters are added to the amino polyamide at room temperature with simple mechanical agitation. When so blended a slight exotherm and a marked reduction in viscosity is noted in most cases. The effect of mixing of various esters in various proportions with an amino polyamide having an amine number of 290–320 and which is derived from polymeric fat acids (dimerized fatty acids consisting principally of dilinoleic acid) and triethylene tetramine are shown in the following Table I.

Table I

| Sample | Ester | Parts ester 100 Parts Polyamide | Viscosity, Poises | Decrease in Viscosity, Percent | Exotherm On Mixing, °C. |
|---|---|---|---|---|---|
| A | | 0 | 650 | 0 | 0 |
| 1 | Dioctyl maleate. | 10 | 527 | 19 | 2 |
| 2 | ---do--- | 20 | 466 | 28 | 3 |
| 3 | Dioctyl fumerate. | 10 | 545 | 16 | 3 |
| 4 | ---do--- | 20 | 464 | 29 | 3 |
| 5 | Dibutyl maleate. | 10 | 564 | 15 | 2 |
| 6 | ---do--- | 20 | 475 | 27 | 3 |
| 7 | Dibutyl fumerate. | 10 | 600 | 7 | 3 |
| 8 | ---do--- | 20 | 504 | 23 | 3 |
| 9 | 2-Ethyl Hexyl acrylate. | 10 | 390 | 40 | 5 |
| 10 | ---do--- | 20 | 307 | 53 | 6 |
| 11 | Hexyl methacrylate. | 10 | 120 | 82 | 7 |
| 12 | ---do--- | 20 | 62 | 91 | 7 |

While a specific polyamide is shown in the foregoing examples, any amino polyamide prepared from the polymeric fat acids and ethylene polyamines or other alkylene polyamines having amine numbers in the range of 80 to 400 or more can likewise be used. The polyamide-ester blends were then reacted in various proportions with an epoxy resin derived from Bisphenol A and epichlorohydrin having an epoxide equivalent of 190–200. (Araldite 6010 supplied by Ciba Company.) The effect of the reaction of the epoxy resin with various polyamide-ester blends is summarized in the following Tables II and III.

Table II

[70 parts Epoxy resin per 30 parts Polyamide-Ester Blend]

| Polyamide-Ester Sample | HDT, °C. | Barcol Hardness | Pot Life | Cure Temperature, °C. | Maximum Temperature of Exotherm, °C. |
|---|---|---|---|---|---|
| A | 74 | 65 | 1 hr., 12 min. | 73 | 96 |
| 1 | 73 | 62 | 2 hrs. | 72 | 72 |
| 2 | 50 | 60 | | | |
| 3 | 76 | 66 | 2 hrs. | | 75 |
| 4 | 45 | 62 | | | |
| 5 | 78 | 66 | 3 hrs., 15 min. | 41 | 40.5 |
| 6 | 68 | 66 | | | |
| 7 | 69 | 65 | | | |
| 8 | 54 | 65 | | | |
| 9 | 74 | 66 | | | |
| 10 | 57 | 63 | | | |
| 11 | 70 | 64 | | | |
| 12 | 66 | 62 | | | |

Table III

[60 parts Epoxy resin per 40 parts Polyamide-Ester Blend]

| Polyamide-Ester Sample | HDT, °C. | Barcol Hardness | Pot Life | Cure Temperature, °C. | Maximum Temperature of Exotherm, °C. |
|---|---|---|---|---|---|
| 1 | 70 | 56 | 2 hrs. | 72 | 72 |
| 2 | 63 | 50 | 2 hrs., 20 min. | 61 | 63 |
| 3 | 72 | 60 | 2 hrs. | 74 | 75 |
| 4 | 66 | 62 | 2 hrs., 40 min. | 47 | 47 |
| 5 | 77 | 61 | | | |
| 6 | 69 | 60 | 3 hrs., 45 min. | 36 | 36 |
| 7 | 71 | 60 | 2 hrs., 25 min. | 50 | 50 |
| 8 | 63 | 63 | 2 hrs., 40 min. | 48 | 48 |
| 9 | 76 | 60 | 1 hr., 45 min. | 75 | 82 |
| 10 | 58 | 58 | 2 hrs., 40 min. | 50 | 50 |
| 11 | 73 | 62 | 1 hr., 35 min. | 84 | 89 |
| 12 | 67 | 55 | 2 hrs., 5 min. | 62 | 64 |

From the foregoing data it can readily be seen that a marked reduction in viscosity occurs on addition of the alpha beta unsaturated ester to the polyamide resin. When these polyamide ester blends are then reacted with epoxy resins it can be seen that the heat distortion temperature is generally equal to or higher than that of the sample in which no ester was used except where 20% of ester was added. Marked increase in pot life is evident along with a marked reduction in the maximum temperature of exotherm.

This invention finds use in applications where it is desirable to have a reduced viscosity system such as hand lay-up and spray-applied laminates, electrical encapsulation, and solventless coating.

We, therefore, claim:

1. A process of curing epoxy resins which comprises reacting 60 to 70 parts by weight of an epoxy resin of a polyhydric phenol and an epihalohydrin, having an epoxy equivalent weight of 140 to 300 with 30 to 40 parts by weight of a polymeric amino polyamide-ester composition, said polyamide ester composition being a mixture of (A) an amino polyamide of the polymeric fat acids and a polyalkylene polyamine with (B) 10 to 20% by weight based on said polyamide of an alkyl ester of an alpha-beta unsaturated acid selected from the group consisting of maleic, fumaric, acrylic and methacrylic acids.

2. A process as defined in claim 1 wherein said polyhydric phenol is 2,2-bis (p-hydroxyphenyl) propane.

3. A process as defined in claim 1 wherein said polyalkylene polyamine has the general formula $$H_2NR(NHR)_nNH_2$$

where R is an alkylene radical and $n$ is an integer from 1 to 6.

4. A process as defined in claim 1 wherein said polyalkylene polyamine is selected from the group consisting of triethylene tetramine, tetraethylene pentamine and mixtures thereof.

5. A cured composition of matter comprising 60 to 70 parts by weight of an epoxy resin of a polyhydric phenol and an epihalohydrin having an epoxy equivalent weight of 140 to 300 with 30 to 40 parts by weight of a polymeric amino polyamide-ester blend, said blend being a mixture of (A) an amino polyamide of the polymeric fat acids and a polyalkylene polyamine having the general formula $$H_2NR(NHR)_nNH_2$$

where R is an alkylene radical and $n$ is an integer from 1 to 6 with (B) 10 to 20% by weight based on said polyamide of an alkyl ester of an alpha-beta unsaturated acid selected from the group consisting of maleic, fumaric, acrylic and methacrylic acids.

6. A composition of matter as defined in claim 5 wherein R is ethylene.

7. A composition of matter as defined in claim 5 wherein said polyhydric phenol is 2,2-bis (p-hydroxyphenyl) propane.

References Cited in the file of this patent

UNITED STATES PATENTS 2,705,223  Renfrew et al. _____ Mar. 29, 1955

OTHER REFERENCES

Floyd: "Polyamide Resins," pages 49–50, received U.S. Patent Office Oct. 2, 1958, Reinhold Pub. Corp., N.Y.